Patented Nov. 13, 1923.

1,474,129

UNITED STATES PATENT OFFICE.

LEOPOLD WEISS, OF VIENNA, AUSTRIA.

MANUFACTURE OF MODIFIED STARCH.

No Drawing. Application filed January 4, 1923. Serial No. 610,695.

*To all whom it may concern:*

Be it known that I, LEOPOLD WEISS, a citizen of the Republic of Austria, residing at Vienna, Austria, have invented Improvements in and Relating to the Manufacture of Modified Starch, of which the following is a specification.

It is well known that, by mixing ordinary water-containing starch without the addition of water with oxidizing media such as dry chloride of lime, hyperoxide of sodium or the like, by which substance oxygen is imparted directly or indirectly, the oxidation of the starch particles into soluble starch can be effected, i. e., a starch is obtained which precipitates in cold water without changing, but which, when boiled is dissolved into a more or less clear solution. Processes have also been proposed for the manufacture of substances which form paste with cold water, from dry products of plants containing starch flour, which are obtained in the form of flakes by drying on rollers heated to above 100° C., in which processes the said flakes are mixed in the dry state with alkaline chemicals or with chemicals having an acid reaction, with substances (for instance hyperoxides) which readily give off oxygen, with chemicals (for instance chloride of lime) which liberate oxygen, or with hygroscopic substances.

The subject of the present invention is a process for the manufacture, from ordinary raw starch or starch-containing material, of a starch product which swells in cold water, and the process consists in this, that a caustic alkali is caused to act in a dry state, on the said material by being intimately mixed therewith, while being subjected to grinding. Reference to the material being in a "dry state" is intended to imply the ordinarily dry condition. Common "dry starch" always contains a substantial percentage of moisture. This, however, is essentially different from a paste or thin fluid which would be formed by mixing ordinary dry starch with water.

The invention is based on the observation that, if starch is ground together with caustic alkalies, these hygroscopic substances eagerly absorb the water present in the starch, causing heating, which combined with the effect of the caustic alkali results in the starch cells swelling. Products obtained in this manner swell in cold water to a jelly-like, transparent consistency.

When neutral swelling starch is to be manufactured, the reaction product described above is neutralized with the stoichiometrical quantity of stable organic acids or acid salts.

According to the amount of alkali used, products are obtained which will take a shorter or longer time to swell.

*Example.*

100 kgs. of potato flour and 5–10 kgs. of caustic soda in lumps are placed in a grinding drum or ball-mill which is closed and put into motion. After the grinding has proceeded for several hours, the starch will have passed into the condition in which it will swell when cold, which is shown by the product which had originally the consistency of flour having assumed the consistency of semolina. When this stage has been reached, the alkaline product may be taken from the mill and used as it is, or, if a neutral product is to be made, then for instance 6–11 kgs. of oxalic acid are added and the mill is allowed to continue to run until the ingredients have become uniformly mixed.

In carrying out this process it is essential that the caustic alkali should come into intimate reaction with the starch, which can be effected by the combined grinding and mixing process.

As compared with the well known oxidization processes of starch particles to soluble starch, the process according to the present invention differs in this, that it is carried out with caustic alkalies instead of with oxidizing media, and produces a product having totally different properties, viz: a starch forming paste in cold water. As compared with the well known process for the manufacture of substances forming paste in cold water from dry products obtained at above 100° C. from plants containing starch flour, the process according to the present invention differs in this, that other substances, viz, raw starch or starch containing substances are used as the primary material, from which substances, a product which swells in cold water is obtained directly in one operation.

What I claim is:

1. A process which comprises grinding together a starchy material and a caustic alkali, both in the normal dry state, whereby the starch is so modified that it will swell in cold water.

2. A process which comprises grinding together a starchy material and a caustic alkali, both in the normal dry state, and thereafter neutralizing the alkali.

3. A process which comprises grinding together a starchy material and about 5 to 10% of its weight of a caustic alkali, both in the normal dry state, whereby the starch is so modified that it will swell in cold water.

4. A process which comprises grinding together a starchy material and about 5 to 10% of its weight of a caustic alkali, both in the normal dry state, and thereafter neutralizing the alkali.

In witness whereof I have hereunto signed my name in the presence of two subscribing witnesses.

LEOPOLD WEISS.

Witnesses:
  Hugo Keik,
  Carl Yondenbury.